(12) United States Patent
Kramer et al.

(10) Patent No.: US 9,985,877 B2
(45) Date of Patent: May 29, 2018

(54) CUSTOMER PREMISES EQUIPMENT VIRTUALIZATION

(71) Applicant: Avago Technologies General IP (Singapore) Pte. Ltd, Singapore (SG)

(72) Inventors: Glen Kramer, Petaluma, CA (US); Nicholas Ilyadis, Merrimack, NH (US)

(73) Assignee: AVAGO TECHNOLOGIES GENERAL IP (SINGAPORE) PTE. LTD., Singapore (SG)

(*) Notice: Subject to any disclaimer, the term of this patent is extended or adjusted under 35 U.S.C. 154(b) by 174 days.

(21) Appl. No.: 14/819,393

(22) Filed: Aug. 5, 2015

(65) Prior Publication Data

US 2016/0352630 A1    Dec. 1, 2016

Related U.S. Application Data

(60) Provisional application No. 62/167,565, filed on May 28, 2015.

(51) Int. Cl.
*H04L 12/24* (2006.01)
*H04L 12/707* (2013.01)
*H04L 12/721* (2013.01)
*H04L 12/851* (2013.01)
*H04L 12/713* (2013.01)

(52) U.S. Cl.
CPC .............. *H04L 45/38* (2013.01); *H04L 41/00* (2013.01); *H04L 45/22* (2013.01); *H04L 45/586* (2013.01); *H04L 47/2483* (2013.01)

(58) Field of Classification Search
CPC ..... H04L 45/38; H04L 47/2483; H04L 41/00; H04L 45/02; H04L 45/22; H04L 45/586
See application file for complete search history.

(56) References Cited

U.S. PATENT DOCUMENTS

| | | | |
|---|---|---|---|
| 2010/0061391 A1* | 3/2010 | Sindhu | H04L 49/1515 370/412 |
| 2012/0144188 A1* | 6/2012 | Agostani | H04L 63/0272 713/153 |
| 2012/0240185 A1* | 9/2012 | Kapoor | H04L 63/1425 726/1 |
| 2014/0047503 A1* | 2/2014 | Marshall | G06F 21/60 726/1 |

(Continued)

*Primary Examiner* — Ayaz Sheikh
*Assistant Examiner* — Debebe Asefa
(74) *Attorney, Agent, or Firm* — McDermott Will & Emery LLP

(57) ABSTRACT

A system is described that improves network function virtualization. The system facilitates an access point, such as a customer premises equipment, to utilize functionality of another access point when providing communication service to a device at a customer premises. The other access point may be a customer premises equipment at a neighboring premises. The access point may utilize the neighboring access point in case the access point is in a power saving state. Alternatively or in addition, the access point may use the other neighboring access point based on bandwidth availability, processing capability, memory capacity, or other attributes, or a combination thereof of the neighboring access point. In yet another example, the access point may utilize the neighboring access point in case of a failure in connection between the access point and a network provider.

20 Claims, 7 Drawing Sheets

(56) References Cited

U.S. PATENT DOCUMENTS

2014/0317293 A1* 10/2014 Shatzkamer ............ G06F 9/455
709/226
2015/0169340 A1* 6/2015 Haddad ............... G06F 9/45533
718/1
2016/0173340 A1* 6/2016 Latham ................ H04L 41/145
370/254

* cited by examiner

CUSTOMER PREMISES EQUIPMENT VIRTUALIZATION

PRIORITY CLAIM

This application claims priority to provisional application Ser. No. 62/167,565, filed May 28, 2015, which is entirely incorporated by reference.

TECHNICAL FIELD

This disclosure relates to network functionality virtualization, particularly virtualization performed by edge customer premises equipment.

BACKGROUND

The processing power, memory capacity, available disk space, and other resources available to processing systems have increased exponentially. Computing resources have evolved to the point where a single physical server may host many instances of virtual machines and virtualized functions. Each virtual machine typically provides virtualized processors, memory, storage, network connectivity, and other resources. At the same time, high-speed data networks have emerged and matured, and now form part of the backbone of what has become indispensable worldwide data connectivity, including connectivity to virtual machine hosts. Improvements in virtualization will drive the further development and deployment of virtualization functionality. Further, rapid advances in electronics and communication technologies, driven by immense customer demand, have resulted in the widespread adoption of mobile communication devices. Many of these devices, e.g., smartphones, have sophisticated processing capability and rely on clocks of different frequencies to perform different processing tasks, e.g., decoding and playback of encoded audio files. In most of such devices, energy consumption is of interest, and reduced energy consumption is often a design goal.

BRIEF DESCRIPTION OF THE DRAWINGS

The examples described throughout the present document may be better understood with reference to the following drawings and description. The components in the figures are not necessarily to scale. Moreover, in the figures, like-referenced numerals designate corresponding parts throughout the different views.

DETAILED DESCRIPTION

Figure 1:
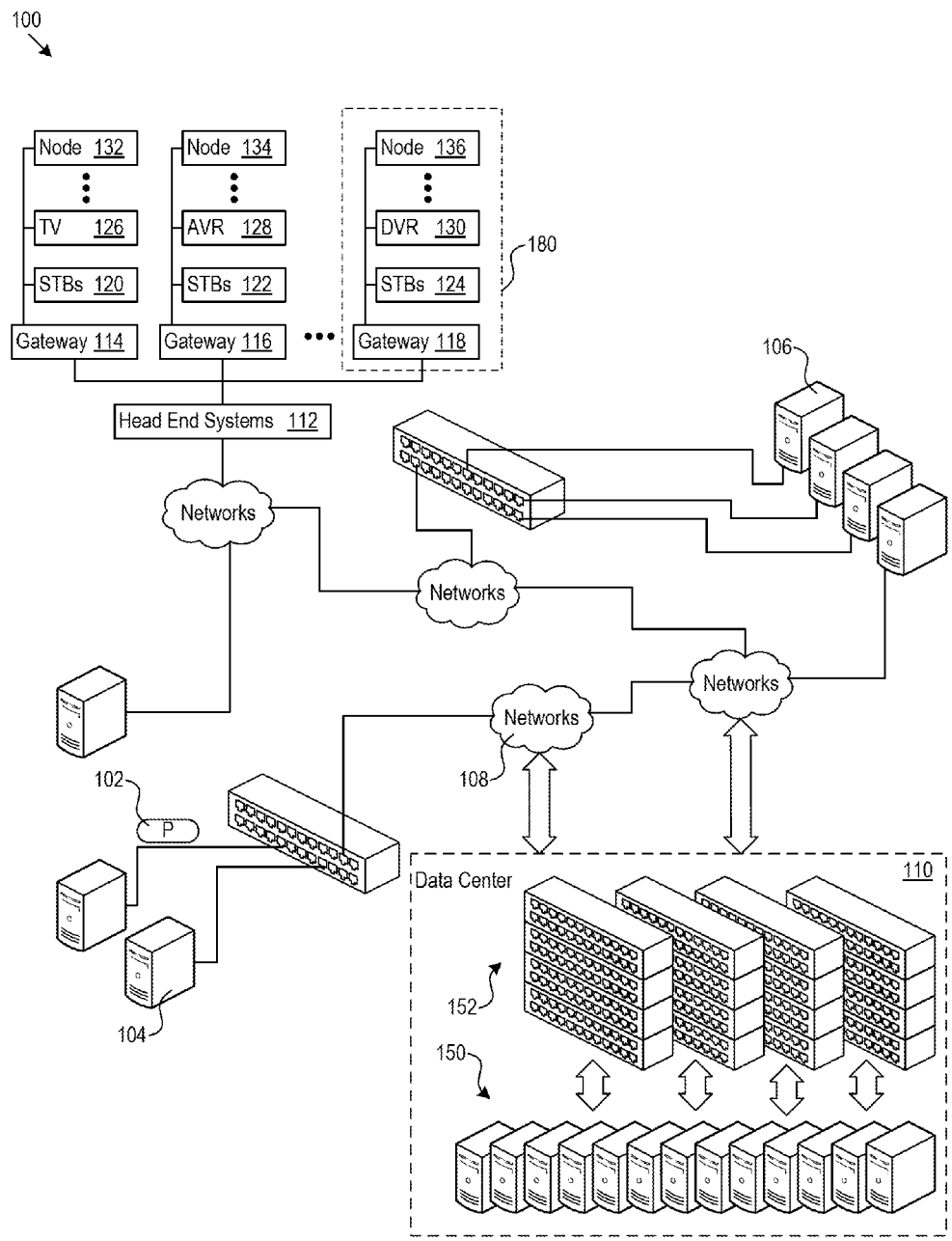
FIG. 1 shows an example of a network that includes virtual machine hosts connected by network devices.

FIG. 1 shows an example network 100. In the network 100, networking devices route packets (e.g., the packet 102) from sources (e.g., the source 104) to destinations (e.g., the destination 106) across any number and type of networks (e.g., the Ethernet/TCP/IP network 108). The networking devices may take many different forms and may be present in any number. The network 108 may span multiple routers and switches, for instance. Examples of network devices include switches, bridges, routers, and hubs; however other types of networking devices may also be present throughout the network 100. The network 108 may be a passive optical network (PON) that includes an optical line terminal (OLT) at a network service provider's central office and a number of optical network units (ONUs) near end users or customers. In an example, the PON may be an Ethernet PON (EPON).

The network 100 is not limited to any particular implementation or geographic scope. As just a few examples, the network 100 may represent a private company-wide intranet; a wide-area distribution network for cable or satellite television, Internet access, and audio and video streaming; or a global network (e.g., the Internet) of smaller interconnected networks. In that respect, the data center 110 may represent a highly concentrated server installation 150 with attendant network switch and router connectivity 152. The data center 110 may support extremely high volume e-commerce, search engines, cloud storage and cloud services, streaming video or audio services, or any other types of functionality.

In the example in FIG. 1, the network 100 includes operators and providers of cable or satellite television services, telephony services, and Internet services. In that regard, for instance, FIG. 1 shows that the network 100 may include any number of head end systems 112 operating with circuitry in the form of head end devices such as a cable modem termination system (CMTS), a digital subscriber line access multiplexer (DSLAM), an optical line terminal (OLT), and/or any other network device for processing and distributing data. The head end systems 112 may provide service to any number of gateways, e.g., the gateways 114, 116, 118. The gateways may represent cable modems, combined cable modems and wireless routers, or other types of entry point systems into any of a wide variety of locations 180, such as homes, offices, schools, and government buildings. The network 100 may include other types of termination systems and gateways. For example, the network 100 may include digital subscriber line (DSL) termination systems and DSL modems that function as the entry points into homes, offices, or other locations. The entry point systems may be referred to as edge customer premises equipment (CPEs), as the entry point systems may be located at respective customer premises.

At any given location, the gateway may connect to any number of any type of node. In the example of FIG. 1, the nodes include set top boxes (STBs), e.g., the STBs 120, 122, 124. Other examples of nodes include network connected smart TVs 126, audio/video receivers 128, digital video recorders (DVRs) 130, streaming media players, gaming systems, computer systems, physical media (e.g., BluRay) players, and any other type of media device.

Communication path redundancy may be provided to the nodes being supported by the gateways 114, 116 and 118 using a second communication path. Such communication path redundancy may be provided by a second communication network, such as a wireless network upon which each of the nodes can communicate among themselves, and with any one of the gateways 114, 116 and 118. In an example, each of the nodes and the gateways includes a wireless transceiver that can communicate on a wireless network such as a Wi-Fi network. In other examples, a cellular network, Bluetooth™, TC/PIP and/or any other wired or wireless communication protocol/system can be used to create the second communication path that redundantly operates with a first communication path provided via the gateways.

Figure 2:
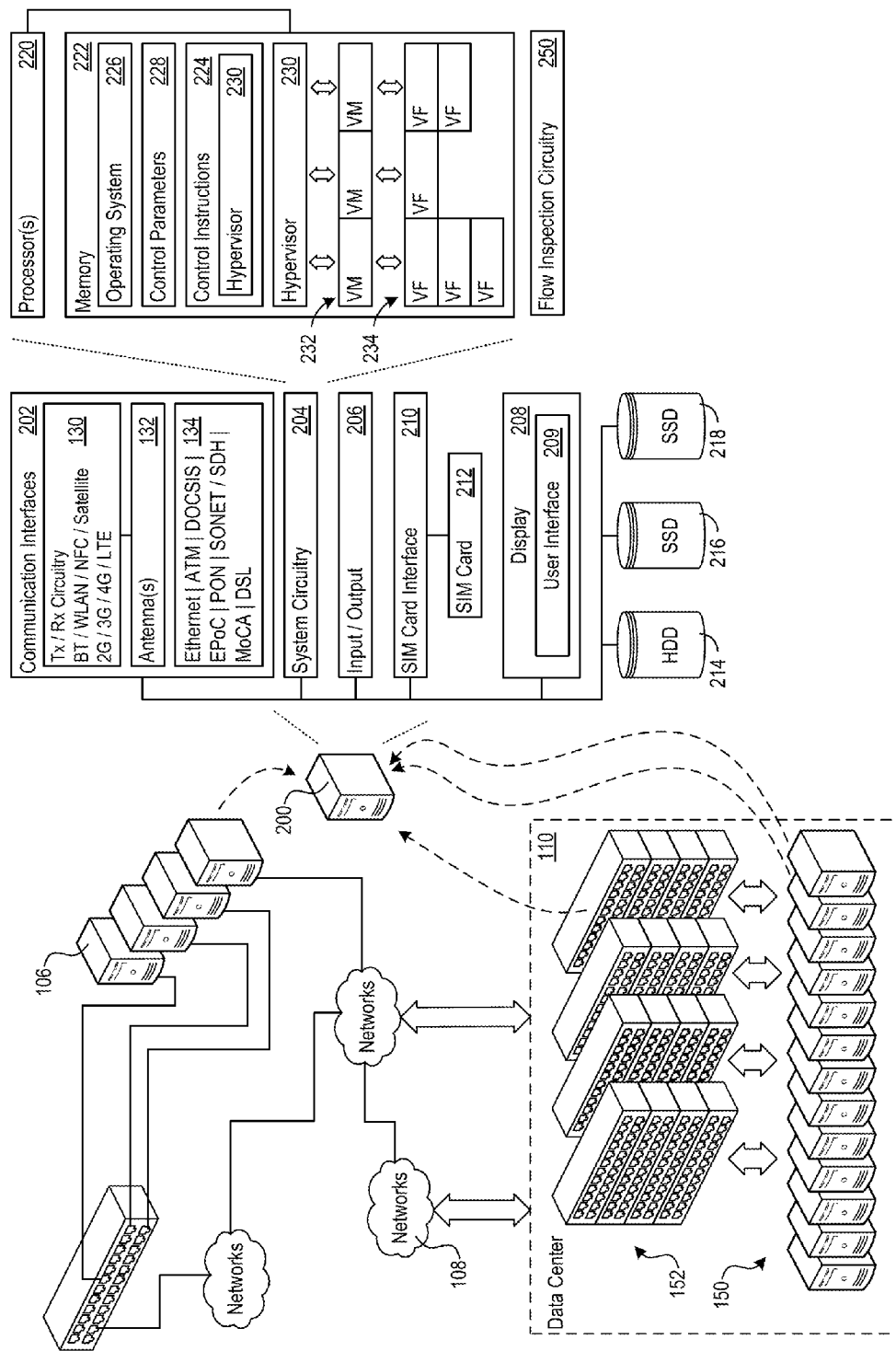
FIG. 2 shows a virtual machine host configured to execute virtual machines and virtual functions.

FIG. 2 shows a virtual machine host 200 ("host") configured to execute virtual machines and virtual functions. Any of the devices in the network 100 may be hosts, including the nodes, gateways, head end systems, switches, servers, sources, and destinations. The hosts provide an environment in which any selected functionality may run, may be reachable through the network 100, and may form all or part of a chain of functionality to accomplish any defined processing or content delivery task. The functionality may be virtual in the sense that, for example, the virtual functions implement, as software instances running on the hosts, functions that were in the past executed with dedicated hardware.

In FIG. 2, the host 200 includes one or more communication interfaces 202, system circuitry 204, input/output interfaces 206, and a display 208 on which the host 200 generates a user interface 209. When the communication interfaces 202 support cellular connectivity, the host 200 may also include a SIM card interface 210 and SIM card 212. The host 200 also includes storage devices, such as hard disk drives 214 (HDDs) and solid state disk drives 216, 218 (SDDs).

The user interface 209 and the input/output interfaces 206 may include a graphical user interface (GUI), touch sensitive display, voice or facial recognition inputs, buttons, switches, speakers and other user interface elements. Additional examples of the input/output interfaces 206 include microphones, video and still image cameras, headset and microphone input/output jacks, Universal Serial Bus (USB) connectors, memory card slots, and other types of inputs. The input/output interfaces 206 may further include magnetic or optical media interfaces (e.g., a CDROM or DVD drive), serial and parallel bus interfaces, and keyboard and mouse interfaces.

The system circuitry 204 may include any combination of hardware, software, firmware, or other logic. The system circuitry 204 may be implemented, for example, with one or more systems on a chip (SoC), application specific integrated circuits (ASIC), discrete analog and digital circuits, and other circuitry. The system circuitry 204 is part of the implementation of any desired functionality in the host 200. In that regard, the system circuitry 204 may include circuitry that facilitates, as just a few examples, running virtual machines, running virtual functions, routing packets between the virtual machines and the network 100, and switching packets between the virtual machines.

As just one example, the system circuitry 204 may include one or more processors 220 and memories 222. The memory 222 and storage devices 214, 216 store, for example, control instructions 224 and an operating system 226. The processor 220 executes the control instructions 224 and the operating system 226 to carry out any desired functionality for the host 200. The control parameters 228 provide and specify configuration and operating options for the control instructions 224, operating system 226, and other functionality of the host 200.

In some implementations, the control instructions 224 include a hypervisor 230. The hypervisor 230 provides a supervising software environment that executes one or more virtual machines (VMs), virtual switches, virtual firewalls, virtual operating systems, virtual network interface cards (NICs), or any other desired virtualization components. In other implementations, the host 200 is a bare-metal virtualization host. That is, the host 200 need not execute a separate operating system 226 on top of which the hypervisor 230 runs. Instead, the hypervisor 230 may directly communicate with and control the physical hardware resources in the host 200 without supervision or intervention through a separate operating system.

The host 200 may execute any number of VMs 232. Each VM may execute any number or type of virtual functions (VFs) 234. The VFs may be software implementations of any desired functionality, ranging, for instance, from highly specialized network functions to general purpose processing functions.

As just a few examples of network functions, the VFs may implement network firewalls, messaging spam filters, and network address translators. As other example of processing functions, the VFs may implement audio and video encoders and transcoders, digital rights management (DRM) processing, database lookups, e-commerce transaction processing (e.g., billing and payment), web-hosting, content management, context driven advertising, and security processing such as High-bandwidth Digital Content Protection (HDCP) and Digital Transmission Content Protection (DTCP-IP) processing. Additional examples of VFs include audio, video, and image compression and decompression, such as H.264, MPG, and MP4 compression and decompression; audio and video pre- and post-processing, server functionality such as video on demand servers, DVR servers; over the top (OTT) servers; secure key storage, generation, and application, and 2D and 3D graphics rendering.

The operators and providers of cable or satellite television services, telephony services, and Internet services, that is, network service providers, may provide the host 200 to a customer. For example, the network service provider may provide a gateway, which may be the host 200. In another example, the network provider may provide a CPE, such as an STB, which may be the host 200. Alternatively, the host 200 may be customer owned. A network service provider may manage operation of the host 200 irrespective of whether or not the network service provider has provided the host 200. In an example, the network service provider may assign a host 200 to a particular location, such as the location 180.

In the following examples, for ease of description, virtualization is performed by the gateways, however the virtualization may be performed by any other CPEs. The virtualization may include distribution of processing, memory, or a combination thereof across the gateways.

In an example the head end system 112 may control functions virtualized by the gateways and/or physical characteristics of the gateways. For example, the CMTS 112 may select one of the gateways, such as the gateway 114 to execute a VM to provide a VF as a service to other gateways. The head end system 112 may make the selection based on a network management policy. For example, the head end system 112 may make the selection based on the workload of the gateway 114. For example, the head end system 112 may identify that the gateway 114 is currently being underutilized. The gateway 114 may be underutilized for several reasons such as the number of nodes connected to the gateway 114 being below a predetermined threshold, or the nodes connected to the gateway 114 using resources below a predetermined threshold.

In addition or alternatively, the gateway 114 may be identified and selected based on the gateway 114's geographic proximity with the other gateways seeking the VF.

For example, the gateway 114 may be within a predetermined distance from the gateway 116. In another example, the gateway 114 may be selected as the candidate host to take over the operations of the gateway 116 based on the gateway 114's virtual proximity with the gateway 116. For example, the gateway 114 and gateway 116 may have successive subnet addresses. The network service provider's policy may prompt selection of a candidate gateway based on various other criteria, and the above are merely exemplary.

In another example, the gateways may coordinate the VF being provided by the gateways to each other. The gateways may coordinate the VFs based on the network policy. The network policy may be stored such that it is accessible by each of the gateways. For example, the network policy may be stored at each gateway. Alternatively or in addition, the network policy may be stored in a central location, such as the head end system 112, that is accessible by each of the gateways. In another example, a central server, such as the head end system 112 may control operations of each of the gateways to coordinate the operations at each of the gateways. The network policy may be stored as a configuration, or a set of rules. Alternatively or in addition, the gateways may coordinate the VFs based on a detected pattern of usage of the respective gateways.

The gateway 114 that is selected to provide the VF as a service to the other gateways may be geographically close to the other gateways such as within a predetermined vicinity of the other gateways to which the gateway 114 provides the VF as a service. Alternatively or in addition, the gateway 114 may provide the VF as a service to other gateways within the same subscriber domain or sub-domain as the gateway 114.

In both cases, whether being controlled by the head end system or by the gateways themselves, it may be initially ensured that the gateway 114 that is selected has the resources to provide the VF. For example, the gateway 114 may be selected to provide a VF once it is ensured that the gateway 114 has the requisite processing power, memory, and network bandwidth, among other factors and a combination thereof. For example, in a one-to-may model, a more capable gateway may be used to proxy for the other gateways which may be less capable. Thus, in an example the network service provider may deploy a high-end gateway, which may cost relatively more, at the location 180 and deploy lower-end and lesser cost gateways in a predetermined proximity of the location 180. The higher-end gateway 114 may be subsequently selected to provide the VF as a service to the other lower-end gateways in its proximity. Thus, the higher-end gateway 114 may be a master gateway providing multiple VFs as a service to the other gateways.

In another example using a many-to-many model, the network service provider may deploy multiple gateways in a locality, such as a neighborhood, the multiple gateways deployed such that they may provide VFs as a service to each other and other relatively lower-end gateways in the locality. In such a model, a gateway may be dynamically selected for a particular VF. That is the gateway selected may be changed periodically or in response to change in circumstances. In such a case the VF may be ported to a hypervisor of another gateway in response to changes in circumstances. For example, say the gateway 114 is first selected to provide a VF service to other gateways. The gateway 114 may execute the VM 232 to provide the corresponding VF. However, due to change in available bandwidth at the gateway 114, the system may dynamically select the gateway 116 to provide the VF. The VM 232 may, in response, be ported from the hypervisor of the gateway 114 to the hypervisor of the gateway 116.

In an example, the gateway 114 may be selected to provide firewall services to the other gateways. The gateway 114 may execute a VM 232 that provides a network firewall. Thus, the VM 232 may process data that is communicated by the devices connected via the gateway 114 such as the node 132, the TV 126, and the STB 120. The VM 232 may be additionally used to process data that is communicated by devices connected via the gateway 116, such as the node 134, the TV 128, and the STB 122. Thus, the gateway 116 may not execute its own firewall. Instead, the gateway 116 may use the firewall services provided by the VM 232 being executed by the gateway 114. The gateway 116 may route data to and/or from the devices connected to the gateway 116 to the gateway 114 for the firewall services. Once the firewall processing at the gateway 114 is complete, the data is re-routed to the gateway 116 and the respective destination device. The gateway 114 may ensure that the data from the gateway 116 is kept separate from data directed to the devices connected to the gateway 114 itself.

The gateway 116, as a result, may use resources that would have been used for firewall services for other purposes, such as encryption, video encoding or any other purpose. While, the example describes gateway 116 using the VF firewall services from the gateway 114, more than one gateway may use the VF services at a time. Also, although the above example describes VM 232 as providing firewall services, other network functionality may be provided in other examples. Additionally or alternatively, the VM 232 may provide more than one service at a time, such as firewall services and data encryption services. Further yet, in an example, the gateway 114 may execute multiple VMs, such as one VM for the firewall services and another VM for the data encryption services. The gateway 116 may utilize some or all of the VMs being executed by the gateway 114.

In another example, data may be cached in different CPEs. For example, the gateway 116 may cache data that is sent to or received from the devices connected to the gateway 116, such as the node 134. For example, the gateway 116 may cache media data, such as a video stream, being accessed by the node 134. Alternatively or in addition, the gateway 116 may cache data associated with a web-browsing session of the node 134. In another example, the gateway 116 may cache data that the node 134 directs to be stored in a network attached storage (NAS) device, such as a cloud-based data storage service provider, or a private NAS. In an example, the gateway 116 may itself provide a NAS service by storing the data on the memory 222. Other examples of data may also be cached by the gateway 116.

The gateway 116 may use a data caching VF provided by one or more other gateways. For example, the gateway 116 may route the data caching requests for the node 134 and the corresponding data to the gateway 114. The gateway 114 may execute the VM 232 that provides data caching services in this example. The gateway 114, via the VM 232, may provide the requisite data caching, by caching the data in the memory 222 of the gateway 114. The gateway 116 may request and access the cached data from the gateway 114 and/or the VM 232 subsequently. Thus, the gateway 116 may cache more data than a cache capacity of the gateway 116 alone. Accordingly, gateway 116 may avoid removing data from the cache that may be in demand shortly.

In other examples, the gateway 116 may be able to cache data received from a remote server at the gateway 114, instead of removing the data from the cache, and in turn prevent requesting the same data from the remote server again. For example, consider the case where the node 134 requests data from multiple remote servers substantially simultaneously, such as by requesting data from a cloud-based data storage, an email server, a media streaming service, among others. The gateway 116 may, in response, cache data from the respective corresponding service providers. The amount of data to be cached may be more than the cache capacity of the gateway 116. In this case, the gateway 116 may cache part of the data with the gateway 114. The latency associated with accessing the data cached with the gateway 114 may be relatively lesser than receiving the data from the corresponding service provider. Accordingly, when the node 134 requests the cached data for presentation, the gateway 116 may, in response, access the cached data from the gateway 114, which may be more efficient, and faster, than requesting the data from the corresponding service provider again.

Figure 3:
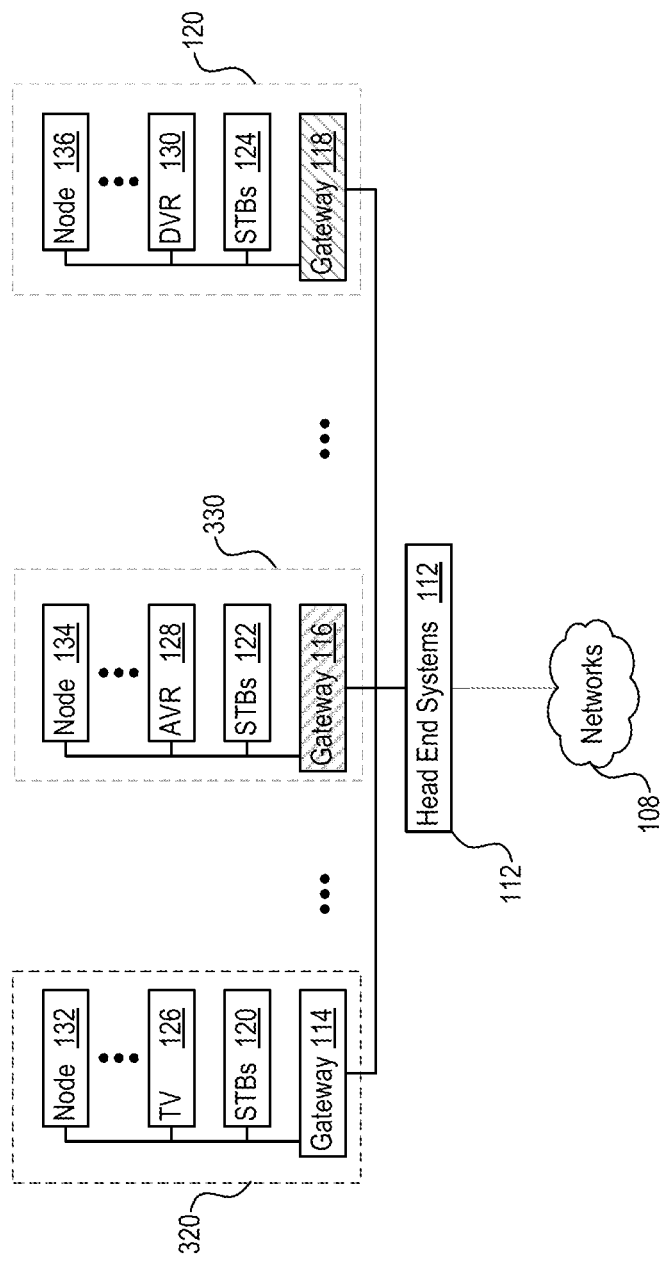
FIG. 3 illustrates example scenarios of virtualizing network functions.

FIG. 3 illustrates example scenarios of virtualizing network functions.

The gateway 114 at customer premises 320 may facilitate communication between a device, such as the node 132 communicatively connected with the gateway 114 and network 108. The gateway 114 may communicatively connected with the node 132 via a first communication path, such as a wired connection illustrated in FIG. 3, or via a second communication path, such as a wireless connection. The first and second communication paths can operate with any wireless or wireline communication protocol. Although the first communication path is described as a wireline communication path, and the second communication path is described as a wireless communication path, in other examples, the first and second communication paths can be either wired or wireless, or some combination that results in redundant communication paths.

The gateways 114, 116, and 118, may facilitate communication on the first and second communication paths between the devices that are located at the corresponding customer premises 320, 330, and 180 respectively and the network 108 via the head end system 112. In an example, the first communication path may represent a primary or default communication path, and the second communication path may represent a back up or auxiliary communication path. Alternatively, or in addition, the gateways 114, 116, and 118 may elect to use the first and/or the second communication path based on system parameters, such as the existence of a choice of either the first or the second communication path being available, communication path congestion, the volume of information being communicated, or any other parameters that could be used to selectively use the first and second communication paths. In case of the first or second communication path including EPON, for example, the gateways 114-118 may be ONUs and the head end system 112 may be an OLT.

For example, in a case where the gateway 118 loses connectivity with the head end system 112, another gateway, such as the gateway 114, may be selected to take over operations of the gateway 118. The gateway 118 may lose connectivity for several reasons. For example, a failure at the gateway 118, a communication link between the gateway 118 and the head end system 112 being broken such as due to repair or any other reason, or the gateway 118 being in standby mode, or any other reason may cause the gateway 118 to lose communication connectivity with the head end system 112. The head end system 112 may identify the gateway 114 as a candidate to take over the operations of the gateway 118 and communicate with the nodes 124, 130 . . . 136 via the second communications path, such as via a wireless communication path. Alternatively or in addition, the gateway 114 may identify itself as a candidate gateway to take over the operations of the gateway 118.

In the above example, the gateway 114 may take over the operation of the gateway 118 by executing services provided by the gateway 118 in one or more virtual machines 232. For example, the node 136 that is communicatively connected to the gateway 118 may communicate with the network 108 via the second communications path and the gateway 114 without any interruption in service caused by the loss in connectivity of the gateway 118. For example, the head end system 112 may route the data destined for the node 136 to the gateway 114, which in turn, may send the data to the node 136 over the second communication path. Upon notification that the gateway 118 is back online, the communication of the node 136 may be restored via the gateway 118 and communication may be reestablished over the first communication path. Thus, the gateways may provide redundancy to protect against unavailability of one or more of the gateways.

For example, in the above scenario, where the gateway 118 is experiencing a failure, a network service provider control device, such as the head end system 112, may detect a change in condition of the connectivity of the gateway 118, such as an outage, and adaptively virtualize functions onto the gateway 114, for example, to provide outage support.

In another example, the head end system 112 may perform scheduled adaptations to control the CPEs such as the gateways. For example, the head end system 112 may power down a first CPE, such as the gateway 116 and virtualize functions of the gateway 116 onto a second CPE such as the gateway 114, for example to reduce power consumption, to load balance, to control bandwidth, to maintain QoS level, or for any other purpose.

Figure 4:
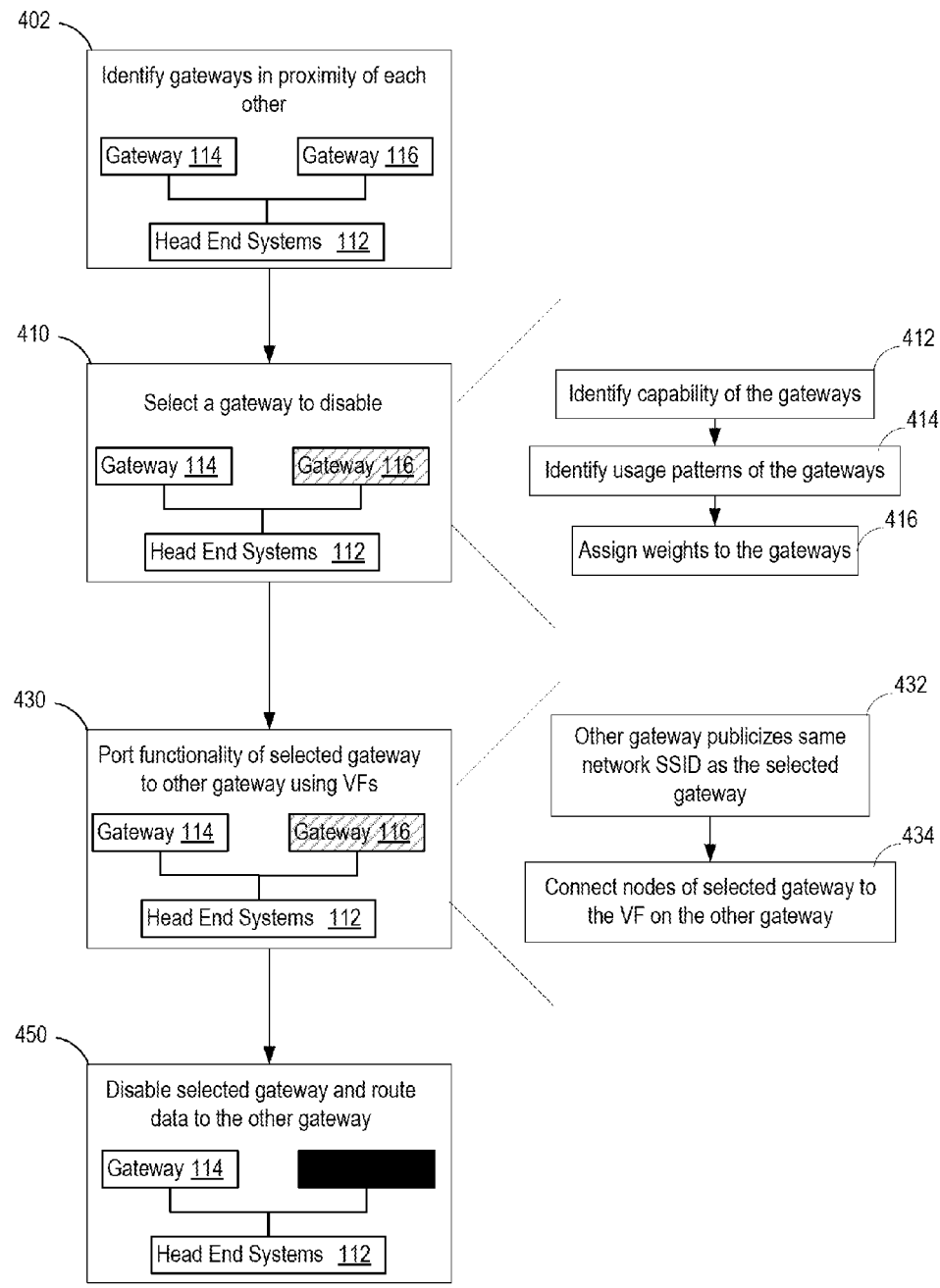
FIG. 4 illustrates an example flow chart of virtualizing a customer premises equipment.

FIG. 4 illustrates an example flow chart of virtualizing a CPE. For example, the head end system 112 may identify that the gateway 116 and the gateway 114 are in close geographic proximity such that a wireless network representing the second communication path being provided by one or both of the gateways is available at the customer premises of the other gateway. (402). The head end system 112 may disable one of the gateways, such as the gateway 116. (450). The head end system 112 may decide which gateway to disable based on the network policy. (410). For example, based on the network policy, the head end system 112 may assign different weights to the gateways based on the respective capabilities such as processing power, memory, radio strength, or any other performance capability. (412, 414). The weights, additionally or alternatively may be assigned on workload of the respective gateway, for example, a gateway with a lower workload may be assigned a higher weight for greater probability of being selected for disabling (or keeping enabled). (416). Based on the weights assigned, the head end system may select the gateway 116 as the gateway to be disabled. (410).

The gateway 114 may execute the VMs 232 to perform the operations of the gateway 116 and communicate over the second communication path. For example, the gateway 114 may adjust a VF that provides firewall services to process data destined for the node 134 of the gateway 116 in addition to the node 132 of the gateway 114 itself. The gateway 114 may provide other functionalities in a virtualized manner either through the single VM or via multiple VMs. The head end system 112 may request the gateway 114 to provide the functionality for the gateway 116.

As part of providing virtualized functionality via the gateway 114, the gateway 114 may publicize the second communication path as a new wireless network with the same service set identifier (SSID) as a wireless network provided by the gateway 116. (432). The new wireless network would be configured substantially similar to the wireless network of the gateway 116, such as the password, subnet masks and other parameters. The node 134 communicatively connected to the gateway 116 would thus be able to communicatively connect to the new wireless network from the gateway 114. (434).

The head end system 112 may be notified when the gateway 114 has been configured to provide virtualized network functionality to replace the gateway 116. In response, the head end system 112 may disable the gateway 116. The head end system 112 may subsequently route data destined to the gateway 116 to the gateway 114. (450). The gateway 114 in turn, via the virtualized functions and the second communication path, may forward the data to the node 134.

In an example, the head end system 112, after porting functionality of the gateway 116 to the gateway 114, may identify another gateway to port the functionality of the gateway 114. In such a case, the another gateway may virtualize the functionalities of both, the gateway 114 and the gateway 116 and communicate at least partially over the second communication path, while the gateways 114 and 116 are disable. Thus, the head end system 112 may save power consumption.

In another example, the head end system 112, after porting functionality of the gateway 116 to the gateway 114, may identify a loss in communication with the gateway 114. In such a case, as described throughout the present document, the head end system 112 may identify the another gateway to port the functionality of the gateway 114 and the gateway 116. Alternatively, the head end system 112 may enable the gateway 116 and port functionality of the gateway 114 to the gateway 116.

In another example, one or more of the gateways, instead of the head end system 112, may port the functionalities among themselves, selectively use the first and second communication paths, and notify the head end system 112 of the changes.

Figure 5:
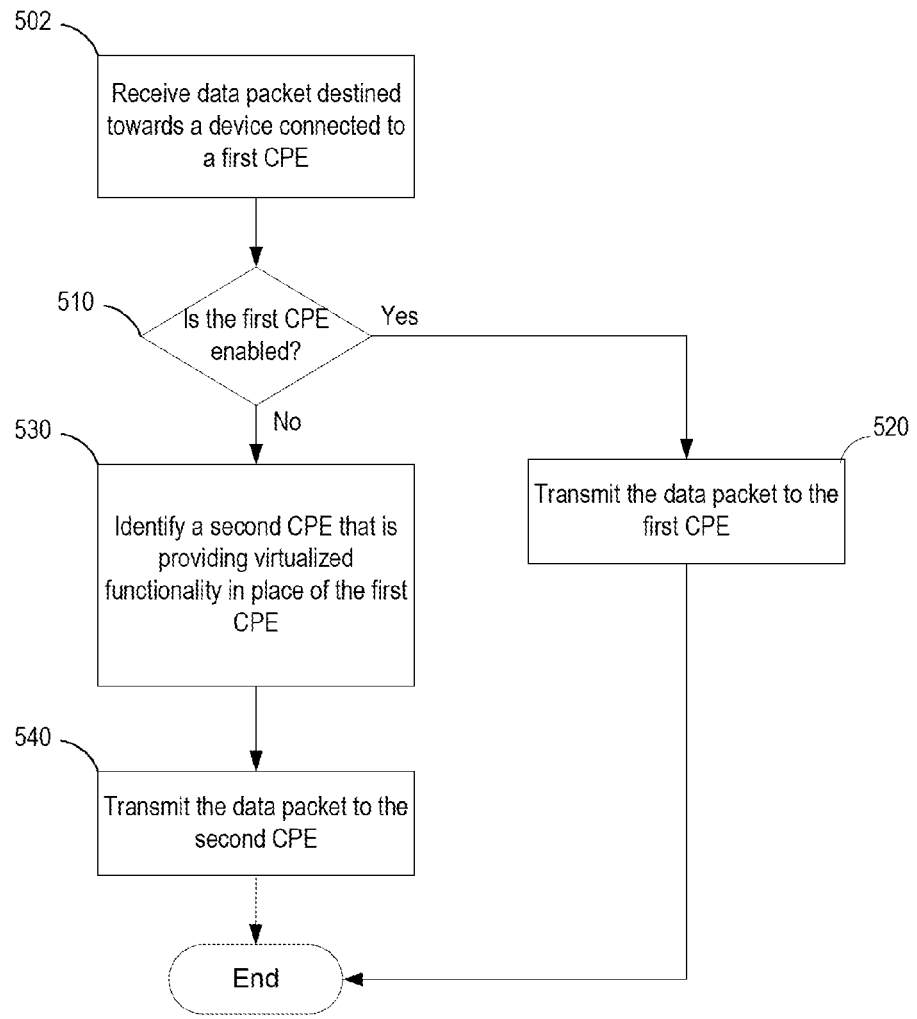
FIG. 5 illustrates an example operational flow diagram that may be implemented by a head end system.

FIG. 5 illustrates an example operational flow diagram that may be implemented with the head end system 112, which may include any head end device, such as an IP-DSLAM, OLT and/or CMTS. The head end system 112, which may be a network device such as described throughout the present document may include a network interface to receive a network flow and a flow inspection circuitry 250 to inspect the network flow and determine a first CPE that will process the network flow. (502). For example, the network flow may include data packets and the flow inspection circuitry 250 may identify the first CPE based on packet destination information within the network flow. For example, the destination information may be in a header of the data packet. The head end system 112 may determine whether the first CPE is active and transmit the data to the first CPE if it is active. (510, 520). Else, the flow inspection circuitry 250 may identify a second CPE that may host a virtualized function associated with the first CPE. (510, 530). The head end system 112 may direct the network flow to the second CPE. (540). The flow inspection circuitry, in an example, may identify that the first CPE is disabled, and in response, direct the network flow to the second CPE. For example, the first CPE may be disabled in response to a connectivity failure associated with the first CPE. Alternatively or in addition, the network switch may disable the first CPE, for example according to an energy policy. The network switch may initialize the virtualized functions at the second CPE in anticipation of the first CPE being disabled. For example, the network switch may identify the second CPE to host the virtualized function based on the second CPE being in a pre-determined signal range from the first CPE, based on geographic proximity or being within a subdomain. Alternatively or in addition, the network switch may identify the second CPE to host the virtualized function based on a topology of the network 108 that includes the network switch and the first and second CPE.

Figure 6:
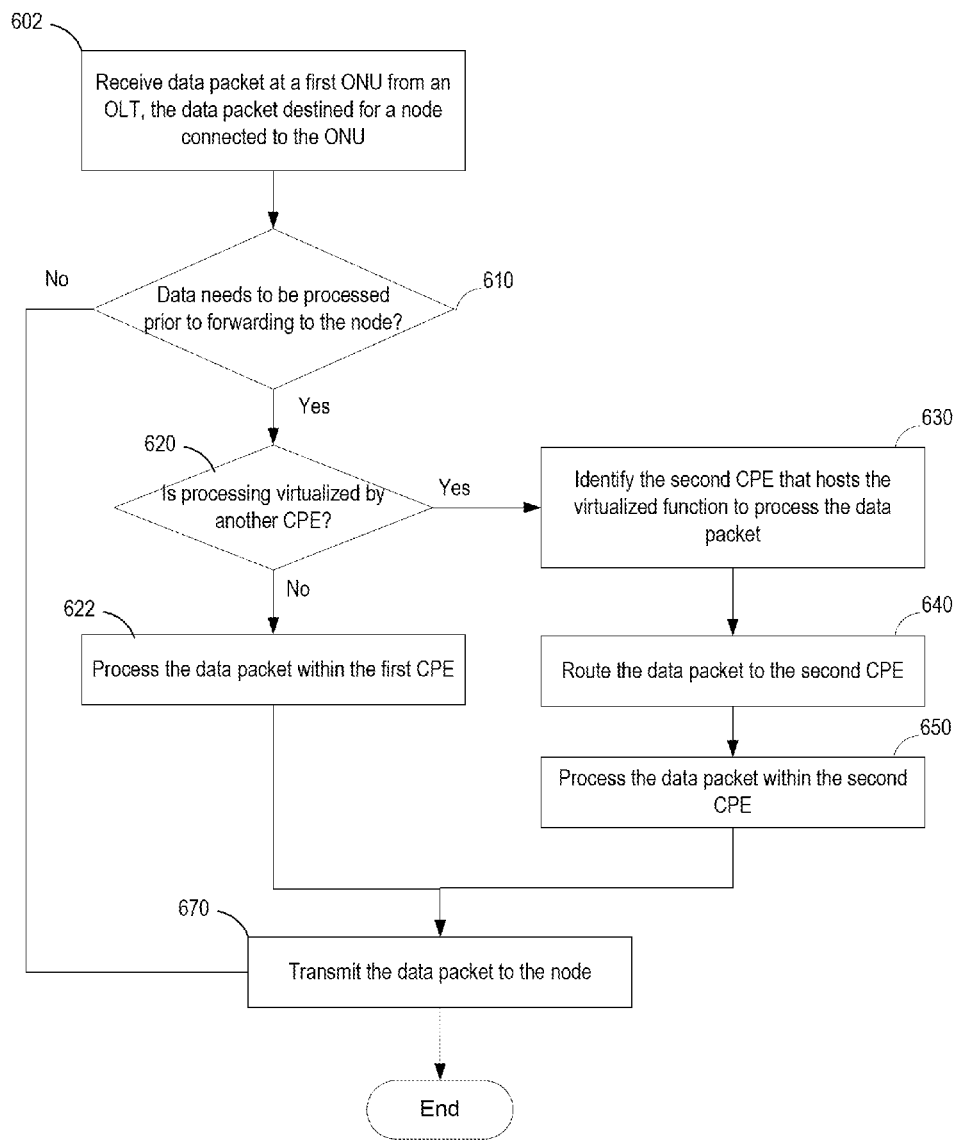
FIG. 6 illustrates an example operational flow diagram that may be implemented by a customer premises equipment.

FIG. 6 illustrates an example operational flow diagram that may be implemented with a CPE. The CPE, which may be an ONU such as the gateway 114 may receive data from a network provider via the head end system 112 and forward the data to customer devices such as the node 132 at the customer premises 320. (602). The head end system 112 may also provide data to another gateway 116 that is at a second premises 330. The gateway 114 may identify processing to be performed on the data received from the network provider prior to forwarding the data to the node 132. (610). The gateway 114 may determine if the data is processed within the gateway 114 itself, and process it accordingly if that is the case. (620, 622). Alternatively, the gateway 114 may identify another CPE such as the gateway 116 that hosts a virtual function to process the data. (630). The gateway 114, prior to forwarding the data to the node 132, may forward the data to the gateway 116 for the processing to be performed on the data. (640). The gateway 114 may receive the processed data from the gateway 116 and subsequently forward the processed data to the node 132. (650). The gateway 114 may forward the processed data to the node 132. (670). The gateway 114 and the gateway 116 may be connected to the same network provider. The gateway 114 may notify the head end system 112 to forward the data to the gateway 116 in response to the gateway 114 being in a power saving state. The gateway 114 may notify the head end system 112 to forward the data to the gateway 116 in response to the gateway 116 being selected to perform the identified processing on the data. The gateway 116 may be selected by the network provider to perform the identified processing. Alternatively, the gateway 116 may be selected by the gateway 114 to perform the identified processing. For example, the gateway 116 may be selected to perform the identified processing based on processing speed, storage capacity, bandwidth, or a combination thereof, of the gateway 116.

Figure 7:
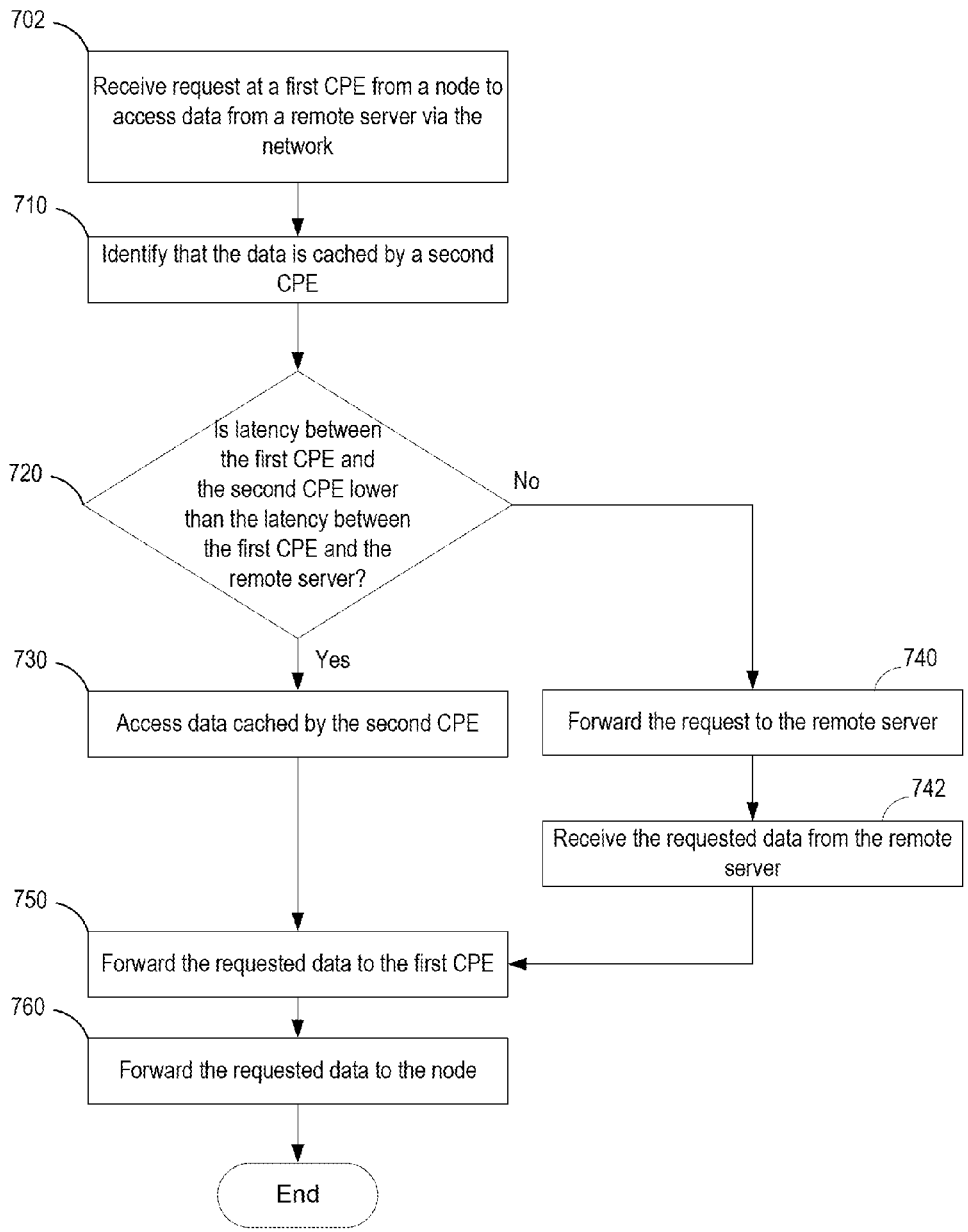
FIG. 7 illustrates an example operational flow diagram.

FIG. 7 illustrates an example operational flow diagram. The operations may include receiving a request at a first CPE, such as the gateway 114 from a customer device such as the node 132 at the first customer premises 320. (702). The request may be for obtaining data from a remote server via a network provider, such as via the head end system 112. For example, the request may be to access a media stream such as a movie, a sporting event, a television show, a radio show, a song, an audio book, a podcast, a document, or any other media stream. The request also may be to access other kinds of data such as email, webpage or the like. The operation may further include receiving, by the gateway 114, identification of a second CPE, such as the gateway 116 from the head end system 112 in response. The head end system 112 may identify that the requested data is cached at the gateway 116 in response to another request for the data from a customer device such as the node 134 at the second customer premises 330. (710). For example, the node 134 at the second customer premises may be accessing the same media stream as the node 132. Thus, the gateway 116 may have buffered the media stream. The head end system 112 may further determine that the latency for the gateway 114 to access the requested data from the remote server may be more than the latency to access the data from the gateway 116. (720). Accordingly, the head end system may access the data cached by the gateway 116 at the second customer premises 330. (720, 730). Alternatively, the head end system 112 may request and receive the data from the remote server. (730, 740, 742). The head end system 112 subsequently may forward the requested data to the gateway 114. (750). The gateway 114 may forward the received data to the node 132 at the first customer premises 320. (760).

In an example, the requested data may include a first part and a second part, where only the first part of the data is cached at the gateway 116. For example, the node 134 at the second customer premises 330 may have paused the media stream and therefore may not have buffered the entire media stream. In this case, the gateway 114 may receive the first part of the data, which has been buffered, from the gateway 116, and the second part of the data from the remote server. The operation may further include sending, by the gateway 114, the second part of the data that was obtained from the remote server, to the gateway 116. Thus, the second CPE or the gateway 116 in this case is made a virtual video host for the first CPE or the gateway 114. Although, only the gateway 114 is described to request the data in the above, multiple gateways may request the data and the gateway 116 may serve as the virtual host to the multiple gateways.

In another example, the gateway 114 may receive, a second request from the node 132 at the first customer premises 320 to upload a second data to the remote server. The gateway 114 may forward the second data to the gateway 116 for caching and further forwarding the second data to the remote server based. The caching may be performed at the gateway 116 based on the latency to send the second data from the gateway 114 to the gateway 116 being lesser than the latency to send the second data from the gateway 114 to the remote server. Further, availability of memory storage to cache the second data at the gateway 116 may be determined prior to forwarding the data to the gateway 116. Further yet, the data may be cached at the gateway 116 in response to the data being larger than the available capacity at the gateway 114. For example, the data may be a large data such as malware signatures, media files, or the like that may not fit within a single CPE. Although, the above example describes caching the data at the gateway 116, the gateway 114 may cache the data at multiple gateways. Thus, the gateways may cooperatively cache large data.

In yet another example, the large data cached by more than one gateway, may be shared by the gateways. For example, if the large data is a malware signature, the gateways may continue to cache the malware signature across the multiple gateways. The gateways may access the cached malware signature in response to subsequent requests at the respective gateways.

In yet another example, the multiple gateways may implement a redundant storage of data to ensure availability of the data during failover. For example, the gateway 114 may store a backup of critical information from one or more other gateways. For example, the gateway 114 may back up configuration information of the gateway 116. The backed up data may be used to restore the gateway 116 upon recovery from a failure.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are to be construed in the broadest sense, superseding any other implied definitions hereinbefore or hereinafter unless expressly asserted to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

Various implementations have been specifically described. However, many other implementations are also possible.

What is claimed is:

1. A system comprising:
    in a network switch:
        a network interface configured to receive a network flow; and
        flow inspection circuitry configured to:
            inspect the network flow to determine that the network flow is directed to or intended for a first customer premises equipment that is directly coupled to a first customer local area network;
            determine whether a second customer premises equipment hosts a virtualized function associated with the first customer premises equipment, the second customer premises equipment being directly coupled to a second customer local area network that is distinct and separate from the first customer local area network; and
            when the second customer premises equipment that is directly coupled to the second customer local area network hosts the virtualized function associated with the first customer premises equipment that is directly coupled to the first customer local area network, direct at least part of the network flow directed to, or intended for, the first customer premise equipment to the second customer premises equipment to perform the virtualized function with respect to the at least the part of the network flow, otherwise direct the network flow to the first customer premises equipment, wherein the second customer premises equipment is different than the first customer premises equipment.

2. The system of claim 1, wherein the flow inspection circuitry is further configured to:
    identify that the first customer premises equipment is disabled, and in response, direct the network flow to the second customer premises equipment.

3. The system of claim 1, wherein the network switch is configured to disable the first customer premises equipment.

4. The system of claim 3, wherein the network switch is configured to disable the first customer premises equipment according to an energy policy.

5. The system of claim 2, wherein the flow inspection circuitry identifies the first customer premises equipment as disabled in response to a connectivity failure associated with the first customer premises equipment.

6. The system of claim 1, wherein the network switch is configured to initialize the virtualized function at the second customer premises equipment.

7. The system of claim 6, wherein the network switch is configured to identify the second customer premises equipment to host the virtualized function based on the second customer premises equipment being in a pre-determined signal range from the first customer premises equipment.

8. The system of claim 6, wherein the network switch is configured to identify the second customer premises equipment to host the virtualized function based on topology of a network that comprises the network switch and the first and second customer premises equipment.

9. A system comprising,
    a first customer premises equipment directly coupled to a first customer local area network and configured to receive data from a network provider and forward the data to a customer device of the first customer local area network:
        the first customer premises equipment configured to identify a processing to be performed on the data received from the network provider prior to forwarding the data to the customer device;
        the first customer premises equipment configured to forward the data to a second customer premises equipment that is directly coupled to a second customer local area network for the processing to be performed on the data; and
        the first customer premises equipment further configured to receive the processed data from the second customer premises equipment and forward the processed data to the customer device over the first customer local area network.

10. The system of claim 9, wherein the first customer premises equipment and the second customer premises equipment are connected to the same network provider.

11. The system of claim 9, wherein the first customer premises equipment is configured to forward the data to the second customer premises equipment in response to the first customer premises equipment being in a power saving state.

12. The system of claim 9, wherein the first customer premises equipment is configured to forward the data to the second customer premises equipment in response to the second customer premises equipment being selected to perform the identified processing on the data.

13. The system of claim 12, wherein the second customer premises equipment is selected by the network provider to perform the identified processing.

14. The system of claim 12, wherein the second customer premises equipment is selected by the first customer premises equipment to perform the identified processing.

15. The system of claim 12, wherein the second customer premises equipment is selected to perform the identified processing based on processing speed, storage capacity, bandwidth, or a combination thereof, available at the second customer premises equipment.

16. A method comprising:
    receiving, from a customer device of a first customer local area network, a request at a first customer premises equipment directly coupled to the first customer local area network, the request being for obtaining data from a remote server via a network provider;
    receiving, by the first customer premises equipment, the requested data directly from a second customer premises equipment that is directly coupled to a second customer local area network, the data bypassing the remote server; and
    forwarding, by the first customer premises equipment, the received data to the customer device of the first customer local area network.

17. The method of claim 16, further comprising:
    receiving, by the first customer premises equipment, identification of the second customer premises equipment from the network provider in response to the network provider identifying that the requested data is cached at the second customer premises equipment in response to another request for the data from a customer device of the second customer local area network.

18. The method of claim 16, wherein the requested data comprises a first part and a second part, and the method further comprising:

receiving, by the first customer premises equipment, the first part of the data from the second customer premises equipment in response to the first part of the data being cached in the second customer premises equipment; and receiving, by the first customer premises equipment, the second part of the data from the remote server.

19. The method of claim 18, further comprising:

sending, by the first customer premises equipment, the second part of the data to the second customer premises equipment.

20. The method of claim 16, wherein the request from the customer device at the first customer premises is a first request, the requested data is a first data, and the method further comprises:

receiving, by the first customer premises equipment, a second request from the customer device of the first customer local area network to upload a second data to the remote server; and sending, by the first customer premises equipment, the second data to the second customer premises equipment for caching and further forwarding the second data to the remote server.

* * * * *